(No Model.)
S. C. MADSEN.
PHOTOGRAPHIC COPYING APPARATUS.
No. 448,447. Patented Mar. 17, 1891.
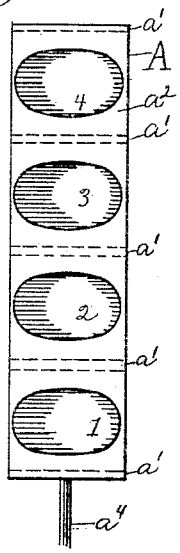
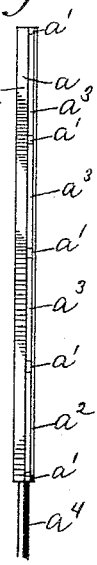
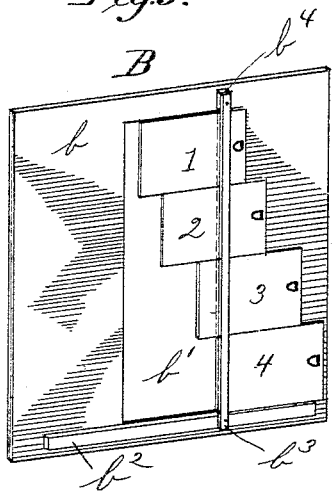
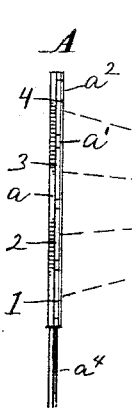
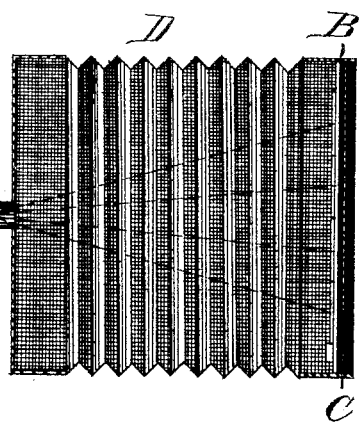
WITNESSES,
Alfred E. Glascock.
M. E. Lansdale.
INVENTOR.
S. C. Madsen
By John S. Duffie
ATTORNEY.

UNITED STATES PATENT OFFICE.

SOREN CHRISTIAN MADSEN, OF SLEEPY EYE LAKE, MINNESOTA.

PHOTOGRAPHIC COPYING APPARATUS.

SPECIFICATION forming part of Letters Patent No. 448,447, dated March 17, 1891.

Application filed June 26, 1890. Serial No. 356,903. (No model.)

*To all whom it may concern:*

Be it known that I, SOREN CHRISTIAN MADSEN, a citizen of the United States, residing at Sleepy Eye Lake, in the county of Brown and State of Minnesota, have invented certain new and useful Improvements in Photograph-Copying Apparatus; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention has relation to photographic apparatus; and it consists in a photographic holder to be used in connection with a multiplying diaphragm and camera.

In the accompanying drawings, Figure 1 is a face view of the photographic holder. Fig. 2 is an edge view of Fig. 1. Fig. 3 is a perspective view of the diaphragm. Fig. 4 is an edge view of the photographic holder and a sectional view of the camera and diaphragm, showing the diaphragm in position immediately in front of the sensitized plate.

The object of my invention is to enable the operator to take a great number of copies or several copies of several photographs or other objects all on one plate without having to remove the plate from the camera during the operation and without having to focus the camera but once.

My invention is described as follows: I make a photographic holder $A$, consisting of the back board $a$, cross-rods $a'$, and a front plate $a^2$, provided with openings 4, 3, 2, and 1. These openings may be of any shape desired. The cross-rods $a^2$ raise the said plate from the face of the board $a$ and leave spaces $a^3$ between the two, in which photographs or other pictures are placed, each one resting on the cross-rod immediately below it. It will be seen that said openings 4, 3, 2, and 1 may be made to expose as much of the picture and no more than is desired to be copied.

The diaphragm $B$ consists of the board $b$, adapted to fit and operate in the rear end of a camera $D$. Said board has in its center a vertical opening $b'$, which is nearly as long as the board is high. Running parallel along with the bottom of said board is a cross-bar $b^2$, its upper edge being a little lower than the lower wall of the opening $b'$. The purpose of this cross-bar is to furnish a bearing for the slide 4 and for the vertical rod $b^3$, the upper end of which rests on a little block $b^4$, and is secured to the said board near its top edge. Said vertical rod is a holder to keep the slides 1, 2, 3, and 4 in place, No. 4 resting on the vertical rod $b^3$, No. 3 on 4, No. 2 on 3, and No. 1 on 2. There are no division-rods between the said slides, so that when all the slides are drawn back the entire vertical opening $b'$ is exposed.

In my drawings I have illustrated four openings in the photographic holder and four slides in the diaphragm; but I may make as many as desired, being restricted only by the size of the camera and the size of the copies to be made.

My invention is constructed, chiefly, to make copies of photographs the size of a two-cent postage-stamp; but I may make them much larger.

To operate the apparatus, place the multiplying diaphragm $B$, with the slides all closed, and a sensitized plate $C$ in the multiplying camera $D$. Then place in opening No. 1 of the holder $A$ a photograph or other picture and attach the holder to a head-rest by means of the rod $a^4$. Then after focusing the camera draw back the slide No. 1 in the diaphragm, and a space on the sensitized plate equal to the size of the opening just made through the said diaphragm will be exposed to the light and the photograph will be copied. Then move the said sensitized plate horizontally a little distance to expose another part of it, and another copy will be taken, then again and again until a full line across the face of the plate is made. Now close slide No. 1, put the same photograph in opening No. 2, and move the sensitized plate backward horizontally one space at a time, as before, and another row of the said photograph is taken. Then close slide No. 2 and put the photograph in opening No. 3, and then draw back slide No. 3 and move the plate forward step by step, taking a copy each time until another row is taken, then close slide No. 3, put the photograph in opening No. 4, and move back the slide No. 4, and take that line and so on, taking as many lines as you have slides in the diaphragm. When it is desired to fill the sensitized plate with copies of different pictures, draw back all the slides, leaving the entire opening $b'$ exposed. Place different photographs in the photographic holder A, then expose the sensitized plate in the camera once. This will make a perpendicular line of different pictures. Then fill the photographic holder again with another set of pictures and move the sensitized plate sidewise, and this will make another perpendicular line of copies. Repeat this process until the plate is full of copies. It is a fact known to the photographic art that the size of the copy does not depend upon the size of the original, but upon the size of the camera and the distance it is from the original. So if I desire to make the copies the same size as the original I situate the camera so that the lens will be exactly equidistant from the original picture and the sensitized plate; but if I wish to make the copy smaller than the original I will situate the camera farther away from the original, and if still smaller still farther away, observing all the time to have the originals far enough apart so that the light reflecting from the said original will each time pass through the lens and fall upon the openings left by drawing the slides 1 2 3 4, &c., and if I desire I may make what I may term a "half-size picture" by withdrawing two of the slides or a full-size picture by withdrawing all the slides, or I may make one half-size copy by withdrawing two of the slides, and then small copies by withdrawing one of the slides at a time. In fact, the possibilities of this multiplying diaphragm can hardly be enumerated, and I do not deem it necessary to the end of obtaining a patent, as its possibilities are more the subject of a trading circular than description.

Having described my invention, what I claim as new, and desire to secure by Letters Patent, is—

1. In combination with a photographic camera and a properly-spaced picture-holder, the multiplying-diaphragm B, consisting of the board $b$, having the vertical opening $b'$, and slides 1, 2, 3, and 4, arranged to slide upon said board and close the said opening, substantially as shown and described, and for the purposes set forth.

2. In combination with a photographic camera D and a properly-spaced picture-holder A, the multiplying-diaphragm B, consisting of the board $b$, having the vertical opening $b'$, slides 1, 2, 3, and 4, cross-bar $b^2$, and vertical bar $b^3$, adapted and arranged to hold said slides in place, substantially as shown and described, and for the purposes set forth.

3. The combination of the photograph-holder A, consisting of the back $a$, lower rod $a^4$, cross-rods $a'$, and the front plate $a^2$, having the openings 4, 3, 2, and 1, photographic camera D, provided with the side openings to receive the diaphragm B, and multiplying-diaphragm B, consisting of the board $b$, having the vertical openings $b'$, and slides 1, 2, 3, and 4, arranged to slide upon said board and close the said openings, said slides made to co-operate with the openings 4, 3, 2, and 1 and with said camera D, for the purposes and in the manner above described.

In testimony whereof I affix my signature in presence of two witnesses.

SOREN CHRISTIAN MADSEN.

Witnesses:
L. G. DAVIS,
E. M. PROCTOR.